Oct. 24, 1944. V. WADE 2,360,918
WALL BOARD MACHINE AND METHOD
Filed Aug. 2, 1940 4 Sheets-Sheet 2
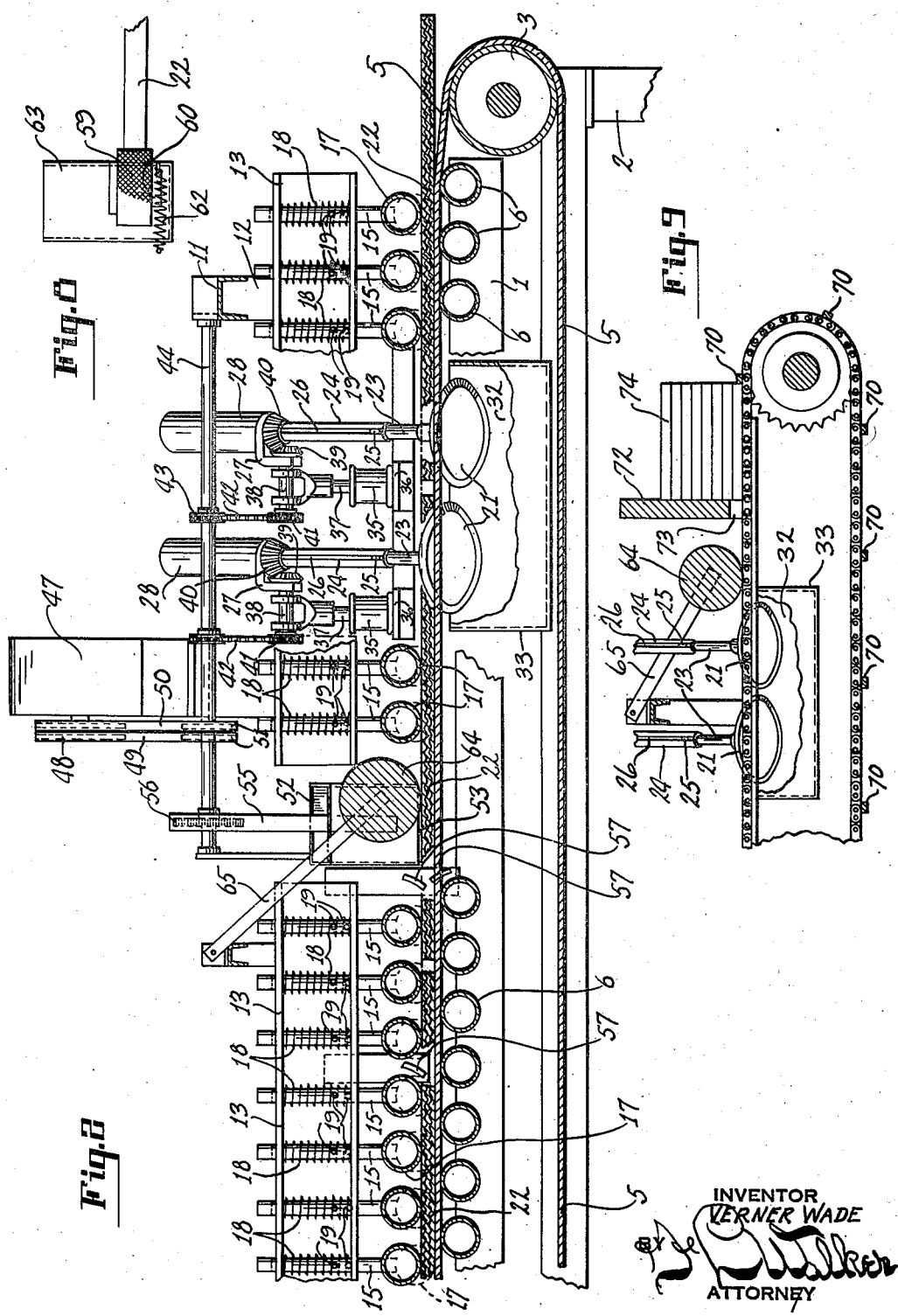
INVENTOR
VERNER WADE
ATTORNEY Oct. 24, 1944.  V. WADE  2,360,918
WALL BOARD MACHINE AND METHOD
Filed Aug. 2, 1940  4 Sheets-Sheet 3
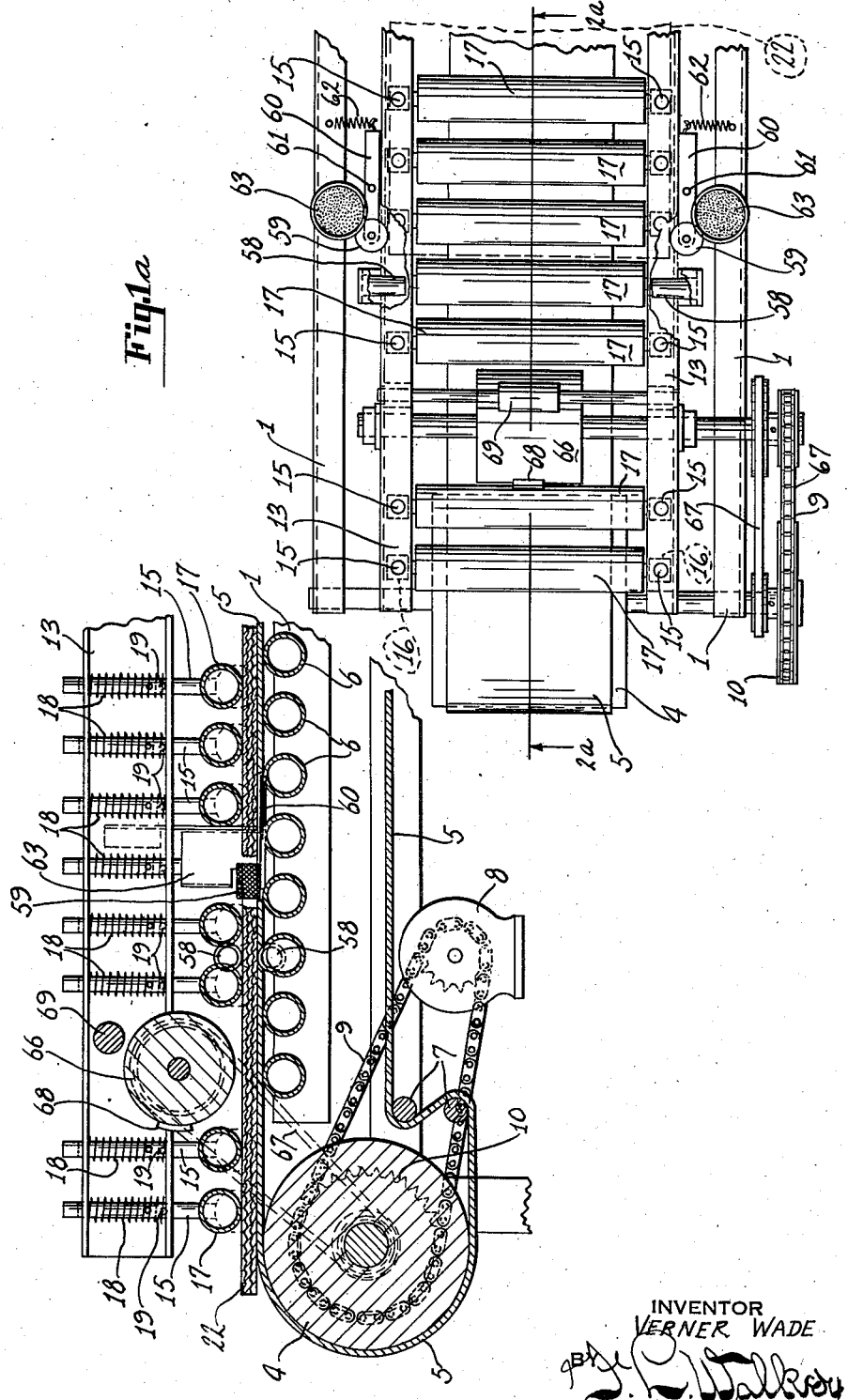
INVENTOR
VERNER WADE
ATTORNEY Oct. 24, 1944. V. WADE 2,360,918
WALL BOARD MACHINE AND METHOD
Filed Aug. 2, 1940 4 Sheets-Sheet 4
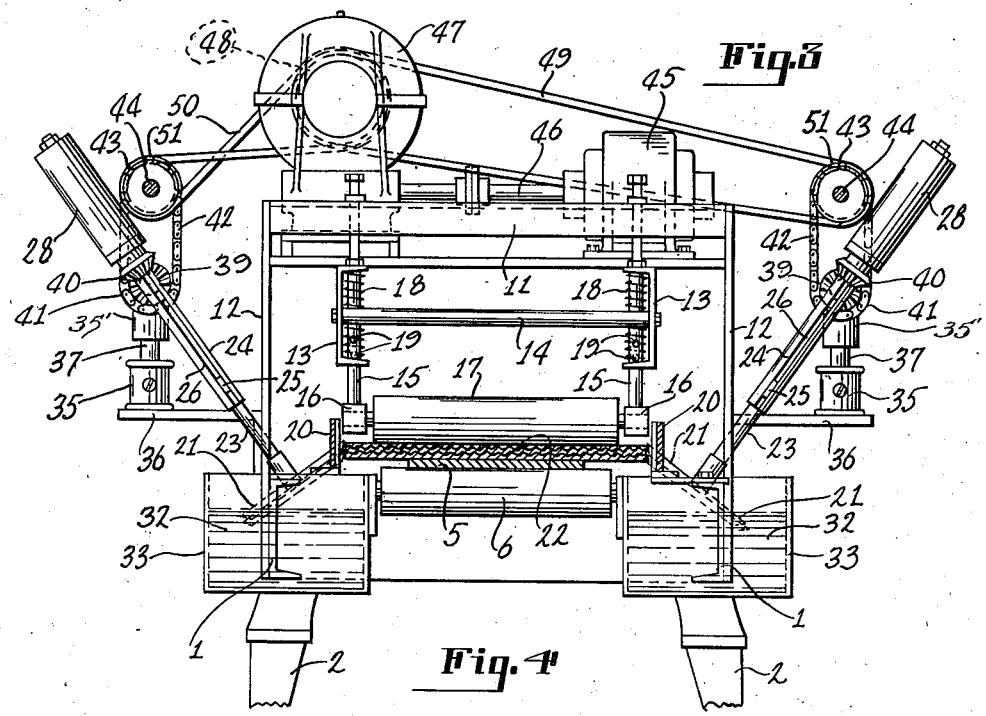
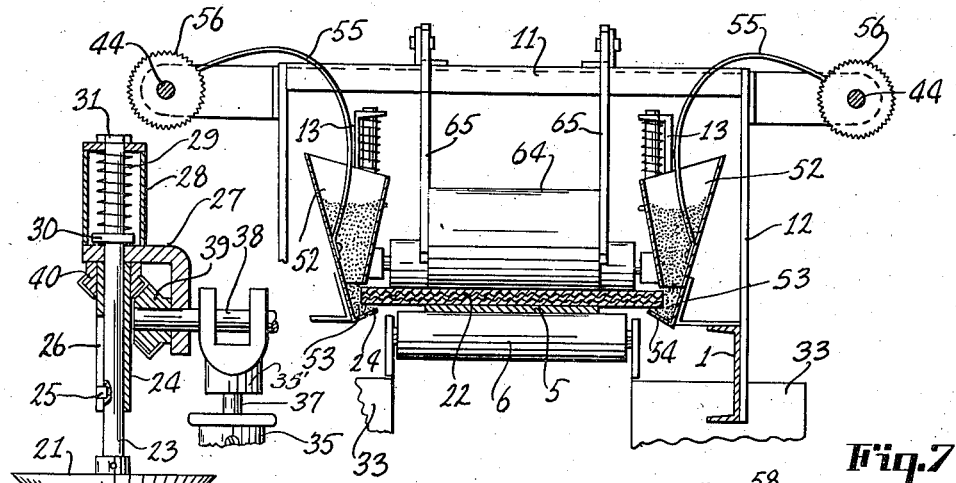
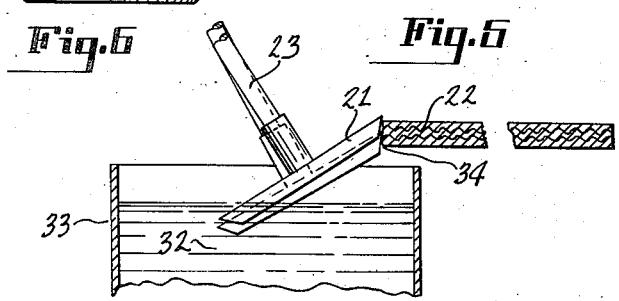
INVENTOR
VERNER WADE
BY
ATTORNEY Patented Oct. 24, 1944

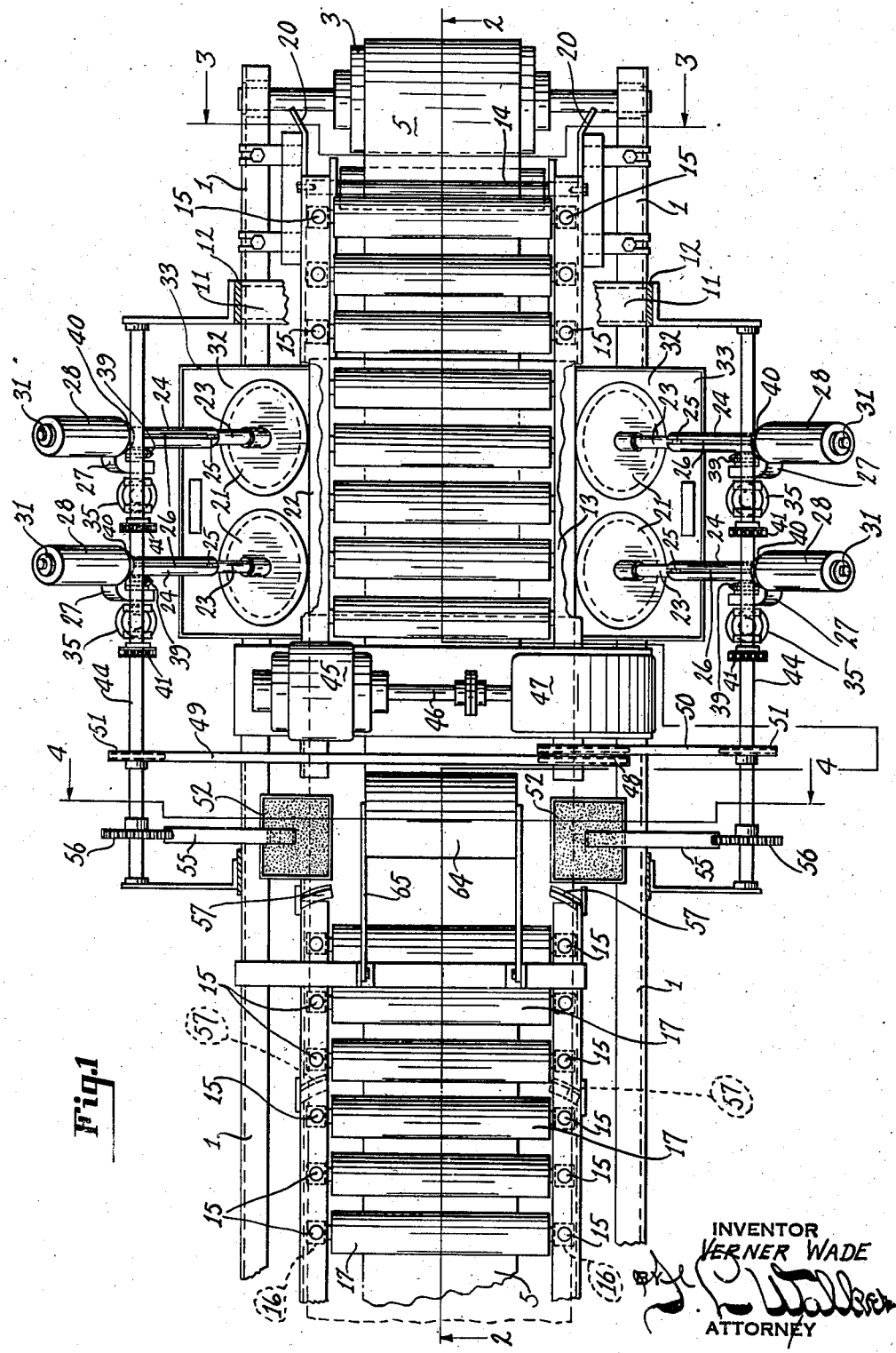

2,360,918

UNITED STATES PATENT OFFICE 2,360,918

WALLBOARD MACHINE AND METHOD

Verner Wade, Fairmont, W. Va., assignor to Fairmont Box Company, Fairmont, W. Va., a corporation of New York Application August 2, 1940, Serial No. 349,936

30 Claims. (Cl. 117—43)

This invention pertains to the manufacture of wall board, and more particularly to an edging and sealing apparatus and method of operation for filling and coating the margins of structural wall board and the like.

In modern building construction, extensive use is now being made of corrugated fiber board as a plaster base for walls and ceilings, to receive a deposit of mortar plaster. Such wall board or plaster base comprises alternating flat and corrugated strata of fibrous paper or the like. Either the flat liner sheets or the interposed corrugated sheets, or both, are preferably of multi-ply construction. Intermediate the succeeding plies thereof are interposed strata of moisture proof cementitious material. The exposed surfaces of such board are ordinarily of porous absorbent character into which the surface deposit of plaster mortar will knit and key with highly tenacious holding effect.

Such laminated board of alternating flat and corrugated strata may be built up to any desired thickness and contain any desired number of such layers. The channels of the interposed corrugated strata form dead air spaces within the board affording effective insulation. However, for best results such internal air cells should be hermetically sealed to confine entrapped air and exclude atmospheric air and moisture therefrom. Heretofore, many ways of sealing the margins of such corrugated board have been proposed, as by adhesive tapes over the edges of the board, or by distorting and overlapping the outermost flat or liner strata of the assembly, which are then united to each other. Other proposals have been to fill the channel ends with cement, earth, sawdust mixed with a binder, and other analogous materials. However, to be commercially successful, the method of sealing such open margins of the board must be rapid and certain, and such that the sealing material will not dry out and loosen. Practical commercial success is dependent upon a large output of treated wall board in relatively short periods of time.

The object of the invention is to improve the construction as well as the means and mode of operation of apparatus for sealing the open margins of corrugated fiber boards, or for marginally coating other board materials, which may not only be economically constructed and operated, but which will be efficient in use, automatic in action, uniform in operation, having relatively few operating parts, and be unlikely to get out of repair.

A further object of the invention is to provide an improved method of applying sealing material within the open ends of the corrugation channels in sufficient quantity to fill them and to distribute the material evenly and uniformly so that a minimum quantity of such material is required.

A further object of the invention is to treat the sealed margins of the board to prevent adhesion of succeeding treated boards and to improve the appearance of the treated edges of the boards.

A further object of the invention is to provide an improved form of applicator and distributor for applying and distributing the sealing material.

A further object of the invention is to provide means for dusting or covering the sealed margins with a dry pulverized material which will neutralize the external tenacity of the sealing material without preventing its permanent union with the several strata of the corrugated board.

A further object of the invention is to provide improved presser means for compressing the filled margins and insuring uniform tenacious contact of the filling material with the board strata.

A further object of the invention is to provide uniform relatively smooth square marginal surfaces for tight butt joint assembly with the other boards.

A further object of the invention is to provide an assembly wherein the successive operations upon the board will be performed in sequence and to provide a conveyor common to the several stages of the sealing operation by which the board operated upon is automatically presented in successive operative positions.

A further object of the invention is to provide an automatic apparatus for sealing the margins of the board, including a feeding device for advancing the boards singly but in continuous succession through the several operative stages.

A further object of the invention is to provide a board sealing apparatus having the advantageous structural features and inherent meritorious characteristics herein mentioned.

A further object of the invention is to provide an improved method of wall board treatment having the herein steps and operations and sequence thereof.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein is illustrated the preferred but obviously not necessarily the only form of embodiment of the invention, Figs. 1 and 1a are a top plan view of the assembled apparatus, shown in two correlated portions, because of the size of the apparatus. Figs. 2 and 2a are conjointly a longitudinal section of the assembled apparatus on lines 2—2 and 2a—2a of Figs. 1 and 1a. Fig. 3 is a transverse sectional view on lines 3—3 of Fig. 1. Fig. 4 is a transverse sectional view on line 4—4 of Fig. 1. Fig. 5 is an enlarged detail view illustrating the relation of the applicator discs to the edge of the board. Fig. 6 is a detail view of the mounting of the applicator discs. Fig. 7 is a detail view of the marginal pressure gage rollers. Fig. 8 is a detail view of the edge finish device. Fig. 9 is a detail view illustrating a modification for use with an automatic board feeder.

Like parts are indicated by similar characters of reference throughout the several views.

There is herein contemplated a method and apparatus for edging and sealing the margins of manufactured plaster board or lath, wall sheathing, roof deck material, and like materials of fiber or pressed pulp, duplex or corrugated paper, or of other fiber composition in molded, pressed or laminated form, and filling, stiffening and water-proofing the edges thereof by application thereto of either hot or cold sealing and filling materials.

By the present apparatus and method of operation various sealing and filling material may be employed which are peculiarly adapted to the particular character and type of board to be edged and sealed, such as tar, pitch, asphalt and various compounds and blends thereof, synthetic and natural resins, chlorinated rubber and various forms of plastics such as Bakelite, tenite, bentonite, and analogous material. Such sealing and filling materials may be used alone or intermixed with filler material incorporated therein such as sawdust, wood fiber, paper pulp material, clays, talc, slate flour, limestone dust, or other inert material. Such filler materials may be used also for surfacing and drying the surface of the sealing material by embedding such dry material in the sticky face of the sealing material. Such treatment as herein disclosed affords a sound, solid edge which will not bruise or bleed or become brittle and which will possess a square abutment surface for a neighboring board, and which will not discolor overlying plaster deposit.

While the method and apparatus are applicable for edging and sealing various other forms of artificial board of porous, cellular or laminated form, for illustrative purposes, but with no intent to unduly limit the application or scope of the invention, it is herein described as applied to corrugated fiber board, comprising alternating flat and corrugated sheets united into a unitary assembly, it is to be understood that the invention is not limited thereto.

In the present mode of operation successive independent sections of preformed board are subjected to a sequence of treatments, including applying to the marginal edges of the board with a wiping or smearing action a viscous adhesive compound or mixture which by entrance into the ends of the channels formed by the corrugations of the board and adhering thereto completely closes and seals the openings to such channels or air spaces. Thereafter, the freshly coated marginal surfaces of the board are dusted with a finely pulverized dry inert material, of which finely comminuted slate dust is preferred, which by intermixture with the surface coating destroys its adhesive characteristics and drys the surface of the sealing material and prevents cracking. The top and bottom marginal areas of the board are then wiped clean of surplus dusting material and then subjected to compression, by which the board strata are firmly pressed against the adhesive sealing deposits within the openings and the board is restored to its original thickness, from which it may have been distended by the impaction of the sealing material in the ends of the channels or passages. The treated margins of the board are then passed between tensioned knurling rollers by which the coated surfaces are evened and squared for flush abutment with other boards and pressed or indented to afford a finished, pleasing appearance. Finally, the board passes under a revolving printing roller by which the board is trade-marked and identifying indicia, the name of the manufacturer and other matter is imprinted thereon.

During its passage through the machine, the two opposite longitudinal margins of the board are simultaneously treated. To similarly treat the leading and trailing margins, two machines, as hereafter described, are preferably installed in right angle relation to each other whereby the treated boards discharged from one machine are directly received upon the extended conveyor of the other machine for travel in a path transversely to their original travel whereby the previously untreated leading and trailing edges become the lateral margins parallel with the direction of travel and receive the same treatment before described.

The two units are substantially identical in construction and operation, except that one is wider than the other to accommodate the length of the boards transversely of the machine and path of travel while the ends of the boards are being treated, whereas the boards are propelled lengthwise through the other unit of less width while the longitudinal edges receive treatment. Hence the illustration and description of one such unit will suffice for both.

The board sections to be treated are received at the right of Figs. 1 and 2 upon a traveling conveyor belt or apron which extends the full length of the machine and transfers the board successively from one stage of operation to another and thence out of the machine. In the drawings, the bed of the machine comprising parallel spaced longitudinal girders or channel beams 1—1 transversely connected to each other, is supported on legs or standards 2—2. Inasmuch as the machine is quite long, to show the parts on sufficiently large scale, each Figs. 1 and 2 is extended onto another sheet as Figs. 1a and 2a respectively. At the front of the machine, bed 1, as shown in Figs. 1 and 2, is mounted a large roller or drum 3. At the rear or discharge end of the machine, Figs. 1a and 2a, is a second drum or roller 4. Extending about the drums or rollers 3 and 4 is an endless conveyor apron or belt 5. The upper or board carrying reach of the conveyor 5 is supported at closely spaced intervals by a succession of supporting rollers 6—6. The lower reach of the conveyor belt 5 is directed about a pair of guide rollers 7. The larger roller or drum 4 at the rear end of the machine is the drive member, which is actuated from a motor 8 by a chain belt 9 engaging a sprocket wheel 10 on the driving drum 4. Supported in elevated position above the level of the conveyor 5 upon transverse bridging members 11, supported on upright struts 12, secured to the machine bed girders or beams 1, is a super structure including parallel spaced longitudinal channel beams 13, interconnected by intermediate transverse tie rods 14.

Mounted in each elevated channel beam 13 for independent vertical reciprocation is a plurality of oppositely disposed roller supporting plungers 15. Each of these reciprocatory plungers is formed at its lower end with a bearing head 16 to receive the trunnions of a succession of pressure rollers 17 mounted therebetween and bearing upon the boards carried upon the conveyor belt 5.

The pressure rollers 17 are urged into engagement with the passing boards by helical springs 18 surrounding the roller support plungers 15 and bearing at their upper ends against the interior of the top flange of the channel beam 13, and at their lower ends against transverse pins 19 carried by the plungers. The rollers 17 are thus free for independent vertical movement against the reaction of the helical springs 18 and independently exert downward pressure on the passing boards to hold them in frictional contact with theh conveyor belt 5.

The boards to be operated upon enter the front or right-hand end of the machine, Figs. 1 and 2, onto the traveling conveyor 5, between terminally flared marginal guide bars 20, and are immediately engaged beneath the initial pressure rollers 17. Disposed at opposite sides of the path of travel of the boards and aligned with the marginal guides 20 are two pairs of beveled applicator discs 21 rotating on inclined axes in planes inclined to that of the traveling boards 22. The applicator discs 21 are carried on reciprocatory shafts 23 (see Fig. 6), each of which in turn is splined within a rotary drive sleeve 24 by means of a key 25 engaging in a longitudinal keyway 26 in the sleeve 24, or vice versa. The applicator disc shaft 23 continues beyond the drive sleeve 24 through an angle mounting bracket 27 into a tubular housing 28 carried thereby. Within the tubular housing 28 the shaft is surrounded by a helical spring 29 abutting at its upper end against the head of the housing and at its lower end upon a thrust collar 30 carried by the shaft within the housing 28. The upper end of the applicator disc shaft projects through the head of the housing 28 and carries a stop nut 31 by which the downward thrust of the applicator disc against the edge of the board, under influence of the spring 29, may be limited.

The lower segments of the rotating applicator discs 21 are submerged in bodies 32 of sealing material contained in tanks 33 at opposite sides of the machine. The sealing material is preferably of viscous adhesive character which becomes softened or semi-fluid under influence of heat and which sets or solidifies without becoming brittle or fragile upon cooling. In practice there is employed a tar-like material or an asphalt or bitumen mixture, either with or without filler material, which is maintained soft and flowable in the tanks 33 by thermostatically controlled electrical or gas heaters (not shown) beneath the tanks 33. Various other sealing materials may be employed, such as synthetic resinous compounds, glue mixtures with sawdust or other fillers, or suitable cement mixtures.

The peripheries of the beveled applicator discs do not exactly coincide with the marginal surfaces of the boards, but are slightly divergent relative thereto, engaging therewith only at the edge of the disc as shown at 34 in Fig. 5. Moreover, the beveled peripheries of the respective applicator discs preferably do not overlap the full thickness of the edges of the board. One pair of applicator discs is adjusted somewhat above the plane of rotation of the other so that a disc at each side of the machine engages coincident with the top plane of the board, and another disc at each side of the machine engages at a midthickness plane of the board. The peripheries of both discs are divergent downwardly relative to the marginal planes of the discs, leaving a slight gap within which the sealing material may drain downwardly over the marginal face of the board, and which allows the semi-fluid sealing material to settle placidly into the openings of the board and not be dragged therefrom by the rotary action of the discs.

The discs 21 travel differentially with the speed of the boards so that there is a wiping or smearing action between the beveled margin of the disc 21 and the edge of the board. In the drawings the applicator discs are indicated as being rotated in the direction of travel of the boards being advanced by the conveyor 5. Such advance rotation is at a somewhat faster speed. However, the applicator discs may be operated at a lesser speed in the reverse direction, that is, contrary to the direction of movement of the boards. This results in a decided spreading or wiping action of the discs upon the board margins, which distributes the sealing material uniformly and causes sealing material to be scraped from the discs by the edges of the passage or channel walls into the openings. In either event the sealing material picked up from the tank during rotation of the discs 21 is applied with a uniform spreading or wiping action upon the edge of the boards, and under pressure of the springs 29 the material is forced into the openings in the board in sufficient quantity to close the openings. The direction of rotation of the discs, and the relative speed of the discs and the traveling boards, as well as the extent to which the material is pressed into the board openings, may all be varied in accordance with the character of the sealing material employed and the nature of the board and shape and size of the openings therein to be sealed.

The discs are mounted for universal adjustment so that they engage the board margins uniformly. Each applicator assembly is independently mounted upon a swivel standard 35 mounted on laterally projecting shelf-like brackets or ledges 36 extending from the machine frame. The upper portion 35' of each standard 35 is mounted therein on a vertical trunnion 37 for rotation about a vertical axis. Such upper section 35' is bifurcated and provided with spaced bearings for a relatively short shaft 38. The shaft 38 carries a bevel gear 39 which intermeshes with a driven bevel gear pinion 40 upon the drive sleeve 24, which in turn rotates the reciprocatory applicator disc shaft 23. The applicator disc, its shaft, and the mounting and drive sleeve are swingingly adjustable about the axis of the shaft 38 and also about the vertical axis 37 within the limits of the drive chain 42.

Each shaft 38 carries a sprocket wheel 41 connected by a chain belt 42 with a sprocket 43 upon a drive shaft 44. The drive shafts 44 at opposite sides of the machine, and the several applicator discs actuated therefrom are driven independently of the conveyor by a motor 45 supported on the super-structure of the machine and connected by a drive shaft 46 with a gear reduction unit 47. The power output shaft of the speed reduction unit 47 carries a pulley 48 connected by belts 49 and 50 with driven pulleys 51 upon the respective drive shafts 44 at opposite sides of the machine.

The opposite vertical edges of the board are thoroughly coated with the viscous adhesive sealing material, by a smearing or wiping action. This causes portions of the sealing material to enter limited distances into the orifices of the board, thus completely closing the openings. Thereupon the board margins are passed between the discharge orifices of two hoppers 52 containing dry comminuted dusting material which, by filling and adhering to the coated surfaces, destroys their stickiness and dries the surface and at the same time improves its appearance. The hoppers 52 are of the gravity feed type, being tapered to lateral outlets 53 at their bottom, below which are lips or small shelves 54 which restrict the out-flow of dry dusting material and support a limited supply of the dry dusting material on such lips in the path of the board margins, through which the sticky, freshly coated margins of the board are advanced. The drying material may be any powdered substance, such as powdered chalk, dry powdered starch, finely pulverized earth or the like. However, a most satisfactory dusting and drying material has been found to be slate dust, finely ground limestone or the like.

In order that the dusting material will not pack in the hoppers, but will feed uniformly therefrom, the hoppers are provided with arcuate spring arms 55 attached to the hopper walls, the free ends of which ride upon the peripheries of serrated wheels 56 on the applicator drive shafts 44. Thus, as the boards are advanced from the coating to the dusting stage, the hoppers 52 are agitated to maintain an ample supply of dusting material at the outlets 53 and in communication with the sticky edges of the passing boards.

Beyond the dusting stage the top and bottom margins of the board are wiped clear of surplus drying dust or powder and any adhering sealing material by wiper flaps 57, preferably, but not necessarily, of sponge rubber. Felt wipers or friction pads of other material may be employed in lieu thereof.

Located beyond the wipers 57 in the path of travel of the coated boards are two pairs of relatively spaced tapered gage rollers 58 rotating on horizontal axes and subjecting the margins of the boards to pressure, perpendicular to the plane of the boards. The spacing of these rollers is such as to compress the filled margins of the board and reduce them to normal thickness, beyond which they may have been distended by the impaction of sealing material in the open marginal spaces. The gage rollers 58 are not power driven but are idler rollers which revolve under frictional influence of the passing boards.

Intermediate the succeeding pairs of gage rollers 58 at each side of the machine is a knurled roller 59 rotating on a vertical axis. The roller 59 is carried upon an oscillatory lever 60 pivoted at 61 and influenced by a retractile spring 62 to press the knurled roller forcibly against the treated marginal edge of the board in the plane thereof. Each knurled roller 59 intersects the lower portion of a small hopper 63 which also contains dry dusting material. The knurled roller, charged with dry dusting material from the hopper 63 bears against the filled margin of the board to imprint a finish surface design thereon and to press the dusting material into such surface. The fact that the knurled roller is charged with dry powder material from the small hopper prevents the filling material from adhering to the roller and pulling away from the board. The dusting powder supplied to the knurling roller 59 may be of different character or of different color from that supplied from the hoppers 52. By using differently colored materials and employing a corrugated or a grooved roller 59, distinctive color effects may be achieved. Likewise, by using a lettered roll identification indicia may be empressed in the treated edge of the board. The gage rollers 58 and knurled roller 59 by exerting pressures in perpendicular directions insure uniform relatively smooth square edges upon the boards which enable tight butt joints between succeeding boards when erected.

A heavy pressure roller 64 journaled in swinging links 65 exerts gravity pressure upon the passing boards before they reach the gage rollers 58 and the edge roller 59.

As a final operation, the marginally sealed boards pass beneath a rotary printing roller 66, the peripheral speed of which is uniform with the travel speed of the treated boards. This printing roller is driven from the conveyor drum 4 by a belt 67. The roller 66 carries a printing plate 68 which is inked from an inking roller 69 supplied from any suitable ink fountain, not shown. Upon each rotation of the roller 66 the printing plate 68 engages the top surface of a passing board and imprints thereon the indicia upon the printing plate 68. This usually comprises a trade-mark or trade name, and the name and address of the manufacturer and any necessary style, grade or size identification. The finished board leaves the machine at the rear end, shown at the extreme left of Figs. 1a and 2a.

It if is desired to feed the machine automatically, the intake end of the traveling conveyor 5 is extended as shown in Fig. 9 and the conveyor is provided with a succession of spaced cleats 70. A stop wall 72 is erected transversely of the conveyor, having at its bottom an escape opening 73 of sufficient size to permit the passage of a single board, but insufficient to pass more than one board. The supply of boards to be treated is stacked at 74 on the conveyor and against the stop wall 72. As the conveyor travels under the stack the successive cleats 70 will each engage the lowermost board of the stack, and push it through the opening 73 beyond which it will travel past the succeeding treatment stages as before described.

From the above description it will be apparent that there is thus provided a device of the character described possessing the particular features of advantage before enumerated as desirable, but which obviously is susceptible of modification in its form proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a wall board treating apparatus, a traveling conveyor on which wall board sections are progressively advanced through successive stages, sealing material applicators having simultaneous engagement with the opposite marginal faces of the passing boards, reservoirs for sealing material from which such material is transferred to the board edges with a wiping action under pressure by which the material is caused to enter the pores, openings and crevices in the marginal face of the board, a pair of dusting devices by which dry pulverized filler material is applied to the freshly sealed surfaces of the board and embedded therein, wipers for removing from the board surplus dusting material, pressure devices for progressively applying pressure to the filled margins of the board in directions perpendicular to the board and also in the plane of the board, and an imprinting device for marking successive sections of the treated board, all in a continuous travel movement through the machine.

2. The herein described method of edging and sealing the margins of wall board and the like, including the steps of applying a viscous adhesive sealing material thereto with a wiping or smearing action by which the sealing material is distributed and forced into pores, crevices and openings in the marginal face of the board, covering the freshly sealed surface of the board with a dry pulverized filler material which becomes embedded in the sealed surface and affords a dry surface dressing therefor, compressing the filled margins of the board to restore it to its original gage beyond which it may have been distended by included sealing material, and pressing the sealed and surface dressed surface in a plane common with that of the board to insure uniform square marginal faces for abutting joint relation with a neighboring board.

3. In a wall board edging and sealing apparatus, means for progressively advancing wall board sections to be treated, a supply reservoir for a supply of viscous adherent sealing material, a rotary beveled applicator disc rotating in a plane inclined to that of the advancing board with its lowermost segment submerged in the supply of sealing material, and its uppermost segment in engagement with the marginal face of the board, the beveled periphery of said disc being in a downwardly divergent plane relative to the marginal face of the board to be treated, driving means for rotating the applicator disc at peripheral speed different from that of the board, whereby the sealing material adhering to the disc will be transferred to the edge of the board with a wiping smearing action by which the sealing material wiped from the periphery of the disc will be forced into the pores, crevices and openings in the marginal face of the board.

4. In a wall board edging and sealing apparatus, a supply reservoir for a supply of viscous adherent sealing material, means for transferring the sealing material to the marginal face of a wall board section, including a rotary applicator therefor and a working face therefor inclined to the plane of the marginal edge of the board to be sealed engaging in line contact longitudinally of the board the marginal face thereof, and means for differentially moving the applicator and board to thereby induce a wiping or smearing action by which portions of sealing material are forced into pores, crevices and opening in the marginal face of the board.

5. In a wall board edging and sealing apparatus, a support for a board to be treated, a traveling applicator the operative surface of which is in downwardly divergent relation with the marginal face of the board, a reservoir for sealing material from which the traveling applicator receives a charge of sealing material, which is wiped therefrom by traveling engagement of the upper portion of the operative surface with the marginal face of the board and forcibly deposited in the pores, crevices and openings of the board margin.

6. In a wall board edging and sealing apparatus, a traveling support for a board to be treated, a rotary disc having a beveled margin mounted for rotation in a plane inclined to that of the board, the beveled margin thereof being in a downwardly divergent plane relative to the plane of the marginal face of the board, a reservoir for a supply of sealing material in which the lowermost segment of the disc is submerged, and from which sealing material is transferred by rotation of the disc to the margin of the board, means for differentially driving the board and the disc to thereby induce a wiping action by which the sealing material carried by the disc is smeared on the marginal face of the board and scraped from the disc into the pores, crevices and openings in the marginal face of the board.

7. In a wall board edging and sealing apparatus, a traveling support for a board to be treated, a rotary disc having a beveled margin mounted for rotation in a plane inclined to that of the board, a reservoir for a supply of sealing material in which the lowermost segment of the disc is submerged, and from which sealing material is transferred by rotation of the disc to the margin of the board, the bevel of the disc periphery and the marginal face of the board being divergent downwardly affording a line contact of the disc with the board and a flow space therebeneath for sealing material, and means for differentially driving the board and disc to effect a wiping action therebetween.

8. The herein described method of edging and sealing wall board and the like, including applying adhesive sealing material to a marginal face thereof by a wiping action of the sealing material against the marginal face of the board in alternating directions inclined to the plane of the board.

9. The herein described method of edging and sealing wall board and the like, including applying adhesive sealing material to a vertical marginal face thereof by a wiping action of the sealing material against the marginal face of the board in a plane inclined toward the vertical plane of the marginal face of the board and in a direction diagonal to the horizontal plane of the top face of the board.

10. In a wall board edging and sealing apparatus, a support for a board to be treated, a plurality of rotary beveled discs mounted for rotation in planes inclined to that of the board and engageable with the marginal face of the board in different planes, one above the other, a reservoir for sealing material from which the sealing material is transferred to the marginal face of the board, and driving means for relatively moving the board and discs at different speeds by which the sealing material is applied to the marginal face of the board with a rubbing action.

11. In a wall board edging and sealing apparatus, a traveling support for a board to be treated, an applicator device for applying to the marginal face of the board an adhesive sealing material, means for supplying dry pulverized filler material in the path of movement of the board through which the adhesively coated edge of the board is passed, and pressure means engaging the filler covered sealed marginal face of the board to embed the dry filler material in the sealed surface.

12. In a wall board edging and sealing apparatus, a traveling support for a board to be treated, an applicator device for applying to the marginal face of the board an adhesive sealing material, a supply reservoir for dry comminuted filler material located contiguous to the path of travel of the board, said reservoir having a discharge outlet directing dry comminuted filler material onto the freshly sealed marginal face of the board, and a presser device for embedding the dry comminuted filler material in the freshly sealed marginal face of the board.

13. In a wall board edging and sealing apparatus, a traveling support for a board to be treated, an applicator for applying to the marginal face of the board an adhesive sealing material, means for applying dry comminuted filler material to the freshly sealed marginal face of the board and effecting a surface union between the sealing material and the filler material.

14. The herein described method of treating wall board, including applying to a marginal face thereof adhesive sealing material by which the pores, crevices and openings of the board are closed and effecting a surface union between the surface of the freshly applied sealing material and a quantity of dry comminuted filler material applied thereto whereby there is afforded a dry non-adhesive surface finish.

15. The herein described method of treating wall board, including applying to a marginal face thereof adhesive sealing material by which the pores, crevices and openings of the face are closed, applying a non-adhesive surfacing material to the freshly sealed marginal face of the board, and subjecting the margin of the board to pressure perpendicular to and in the plane thereof.

16. In a wall board edging and sealing apparatus, a traveling support for a board to be treated, an applicator for applying adhesive sealing material to a marginal face of the board, means for applying a non-adhesive surface coating to the freshly sealed marginal face, a pair of relatively spaced gage rollers between which the sealed margin of the board is passed and by which the thickness of the board is reduced to a predetermined thickness beyond which it may have been distended by the entry of the sealing material thereinto.

17. In a wall board edging and sealing apparatus, a traveling support for a board to be treated, an applicator for applying adhesive sealing material to a marginal face of the board, means for applying a non-adhesive surface coating to the freshly sealed marginal face, and a pressure gage past which the sealed margin of the board is advanced and by which the thickness of the sealed margin is reduced.

18. In a wall board edging and sealing apparatus, a traveling support for a board to be treated, an applicator for applying adhesive sealing material to a marginal face of the board, means for applying a non-adhesive surface coating to the freshly sealed marginal face, and means for simultaneously subjecting the sealed margin of the board to perpendicular and lateral pressure.

19. In a wall board edging and sealing apparatus, a traveling support for a board to be treated, an applicator for applying adhesive sealing material to a marginal face of the board, means for applying a non-adhesive surface coating to the freshly sealed marginal face, and a pressure device having engagement with the coated surface of the marginal face for shaping and compressing the sealed marginal face of the board.

20. An applicator for applying sealing material to a marginal face of a wall board comprising a beveled disc mounted for rotation in a plane inclined to that of the board and having peripheral contact with the marginal face to be sealed, a reservoir for sealing material from which sealing material is transferred to the marginal face of the board by rotation of the disc, pressure means for yieldingly urging the disc axially into contact engagement with the marginal face of the board, a universal mounting for said disc enabling limited automatic adjustment of the disc into conformity with the marginal face of the board, and means for differentially moving the board and disc by which a wiping contact action is induced therebetween by which the sealing material is distributed and displaced from the disc into the pores, crevices and openings of the marginal face of the board.

21. An apparatus for coating plane edge surfaces, including an applicator disc revolvable in a plane inclined to the horizontal and having a beveled periphery, a container for a supply of coating material into which the lower segment of the beveled periphery of the disc dips, means for revolving the disc for transferring a film of coating material from the beveled periphery face of the disc to a perpendicular plane edge surface to be coated, said beveled peripheral face of the applicator disc being disposed in downwardly divergent relation with the perpendicular coat receiving surface within the field of application of the coating material whereby a convergent supplemental supply of coating material is accumulated intermediate the periphery of the applicator disc and the surface being coated.

22. A apparatus for coating plane edge surfaces, including a revoluble applicator disc rotating in a plane inclined to the perpendicular, a container for a supply of coating material in which the lower segment of the revoluble disc is submerged, means for rotating the disc to transfer a stratum of coating material from the container to a perpendicular edge surface of a traveling body being advanced in a substantially tangential direction relative to the disc, the coating material carrying surface of the disc being disposed in a slightly inclined relation to the perpendicular edge surface to be coated, whereby an intermediate downwardly divergent space is formed within the field of operation for accumulation of a surplus supply of coating material therein.

23. An apparatus for coating perpendicular edge surfaces, including a traveling applicator having progressive engagement with the top margin of a perpendicular edge surface of a traveling body to be coated, including a working face inclined to said edge surface, a container for a supply of coating material into which a portion of the applicator progressively dips, means for actuating the traveling applicator to transfer a stratum of coating material from the container to the top margin of said perpendicular edge surface over which the transferred coating material is permitted to drain downwardly by gravity intermediate the inclined working face of the applicator and the perpendicular edge surface of the traveling body in adherent relation with said perpendicular edge surface.

24. The herein described method of coating perpendicular edge surfaces, including transferring from a supply of coating material an excess thereof to the top margin of a perpendicular edge surface of a traveling body and permitting the transferred deposit thereof to drain downwardly over such surface by gravity.

25. The herein described method of coating perpendicular edge surfaces, including transferring from a supply of coating material an excess thereof to the top margin of a perpendicular edge surface of a traveling body and permitting the transferred deposit thereof to drain downwardly over such surface by gravity, and simultaneously limiting the outward deflection of the deposited material during drainage whereby the surplus thereof is forced into said perpendicular surface being coated.

26. The herein described method of coating perpendicular edge surfaces, including transferring from a supply of coating material an excess thereof to the top margin of a perpendicular edge surface of a traveling body and permitting the transferred deposit thereof to drain downwardly over such surface by gravity, and simultaneously applying pressure to the deposit in a direction toward the perpendicular surface being coated.

27. The herein described method of coating perpendicular edge surfaces, including transferring from a supply of coating material an excess thereof to the top margin of a perpendicular edge surface of a traveling body and permitting the transferred deposit thereof to drain downwardly over such surface by gravity, and simultaneously subjecting the deposited accumulation of drainage material to a wiping action in a diagonal direction across the perpendicular surface being coated.

28. An apparatus for coating a perpendicular edge surface, including an applicator having an operating face engaging the perpendicular surface to be coated in a plane transversely inclined thereto, whereby there is formed a vertically convergent space intermediate the applicator and the perpendicular surface, means for effecting an accumulation of coating material within said convergent space, and actuating means for effecting relative movement of the applicator and the perpendicular surface being coated by which the accumulation of material within said converging space is subjected to a wiping action upon the perpendicular surface.

29. The herein described method of treating the margins of wall board or the like, including initially coating the marginal face of the wall board with a viscous adhesive sealing material, destroying the adhesive character of the exposed surface of the adhesive sealing material by distributing thereover a dry finely comminuted dusting material, pressing the coated and dusted surface into a plane perpendicular to the general plane of the board, and empressing the formed, coated and dusted marginal face.

30. The herein described method of treating the margins of wall board or the like, including initially coating the marginal face of the wall board with a viscous adhesive sealing material, destroying the adhesive character of the exposed surface of the adhesive sealing material by distributing thereover a dry, finely comminuted dusting material, compressing the board to its original thickness after application of the coating and dusting material to the marginal face thereof, and pressing the coated and dusted surface into a plane perpendicular to the general plane of the board.

VERNER WADE.